US006768730B1

(12) United States Patent
Whitehill

(10) Patent No.: US 6,768,730 B1
(45) Date of Patent: Jul. 27, 2004

(54) SYSTEM AND METHOD FOR EFFICIENTLY PERFORMING TWO-WAY RANGING TO DETERMINE THE LOCATION OF A WIRELESS NODE IN A COMMUNICATIONS NETWORK

(75) Inventor: Eric A. Whitehill, Fort Wayne, IN (US)

(73) Assignee: MeshNetworks, Inc., Maitland, FL (US)

( * ) Notice: Subject to any disclaimer, the term of this patent is extended or adjusted under 35 U.S.C. 154(b) by 226 days.

(21) Appl. No.: 09/973,799

(22) Filed: Oct. 11, 2001

(51) Int. Cl.$^7$ .............................................. H04B 7/212
(52) U.S. Cl. ...................... 370/348; 455/434; 455/450
(58) Field of Search ................................ 370/348, 346, 370/343; 455/434, 450, 450.2, 515

(56) References Cited

U.S. PATENT DOCUMENTS

| | | | |
|---|---|---|---|
| 4,494,192 A | 1/1985 | Lew et al. .................. 364/200 |
| 4,617,656 A | 10/1986 | Kobayashi et al. ........... 370/74 |
| 4,736,371 A | 4/1988 | Tejima et al. ................. 370/95 |
| 4,742,357 A | 5/1988 | Rackley ..................... 342/457 |
| 4,747,130 A | 5/1988 | Ho .............................. 379/269 |
| 4,910,521 A | 3/1990 | Mellon ........................ 342/45 |
| 5,034,961 A | 7/1991 | Adams ........................ 375/130 |
| 5,068,916 A | 11/1991 | Harrison et al. .............. 455/39 |
| 5,231,634 A | 7/1993 | Giles et al. ................. 370/95.1 |

(List continued on next page.)

FOREIGN PATENT DOCUMENTS

| | | |
|---|---|---|
| CA | 2132180 | 3/1996 |
| EP | 0513841 A3 | 11/1992 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Richard North, Dale Bryan and Dennis Baker, "Wireless Networked Radios: Comparison of Military, Commerical, and R&D Protocols", Feb. 28–Mar. 3, 1999, $2^{nd}$ Annual UCSD Conference on Wireless Communications, San Diego CA.

(List continued on next page.)

Primary Examiner—Ajit Patel
Assistant Examiner—Chirag Shah
(74) Attorney, Agent, or Firm—Gardner Carton & Douglas LLP; Joseph J. Buczynski

(57) ABSTRACT

A system and method for reducing the number of transmissions required for a node in a communications network to range other nodes in the network, while also enabling the node to continuously monitor the reservation channel during the ranging process without the use of a second receiver, and to indicate to the ranged node and other nodes in the network that the ranging node and the ranged node are not tuning to a data channel to perform the ranging, to thus enable the node to more efficiently determine its geographic location. The system and method further enables a node in a wireless communications network to minimize the amount of time it is not monitoring the reservation channel while receiving information messages from other nodes in the network.

21 Claims, 4 Drawing Sheets

U.S. PATENT DOCUMENTS

| | | | |
|---|---|---|---|
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas et al. | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 * | 2/2002 | Li | 455/450 |
| 6,404,756 B1 * | 6/2002 | Whitehill et al. | 370/338 |
| 6,453,168 B1 * | 9/2002 | McCrady et al. | 455/517 |
| 6,545,995 B1 * | 4/2003 | Kinnunen et al. | 370/341 |
| 6,556,582 B1 * | 4/2003 | Redi | 370/443 |
| 2001/0009544 A1 * | 7/2001 | Vanttinen et al. | 370/338 |
| 2001/0053699 A1 | 12/2001 | McCrady et al. | 455/513 |
| 2002/0154622 A1 | 10/2002 | Hammel et al. | |
| 2002/0167963 A1 | 11/2002 | Joa-Ng | |

OTHER PUBLICATIONS

"OSPF Version 2", Apr. 1998, Internet RFC/STD/FYI/BCP Archives.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the 4$^{th}$ Annual ACM/IEEE International Conference on Mobile Computing and Networking.

C. David Young, "USAP: A Unifying Dynamic Distributed Multichannel TDMA Slot Assignment Protocol".

Chip–Elliott and Bob Heile, "Self–Organizing, Sef–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Martha E. Steenstrup, "Dynamic Multipoint Virtual Circuits for Multimedia Traffic in Multihop Mobile Wireless Networks".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

* cited by examiner

SYSTEM AND METHOD FOR EFFICIENTLY PERFORMING TWO-WAY RANGING TO DETERMINE THE LOCATION OF A WIRELESS NODE IN A COMMUNICATIONS NETWORK

CROSS-REFERENCE TO RELATED APPLICATIONS

Related subject matter is disclosed in a U.S. patent application of Eric A. Whitehill et al. entitled "Methods and Apparatus for Coordinating Channel Access to Shared Parallel Data Channels", Ser. No. 09/705,588, filed on Nov. 3, 2000, and in a U.S. patent application of Dennis D. McCrady et al. entitled "Method and Apparatus for Determining the Position of a Mobile Communication Device Using Low Accuracy Clocks", Ser. No. 09/365,702, filed on Aug. 2, 1999, the entire content of both of said applications being incorporated herein by reference.

BACKGROUND OF THE INVENTION

1. Field of the Invention

The present invention relates to a system and method for efficiently performing two-way ranging to determine the location of a wireless node, such as a user terminal, in a communications network. More particularly, the present invention relates to a system and method for reducing the number of transmissions required between a source node and reference nodes to determine the geographic location of the source node, and for reducing the number of transmissions required for the source node to retrieve data from any of the reference nodes.

2. Description of the Related Art

Carrier Sense Multiple Access with Collision Avoidance (CSMA/CA) is a well-known protocol specified in the IEEE802.11 standard for wireless local area networks (LANs) which enables wireless communications devices to communicate with each other. CSMA/CA involves an initial handshake of a Request-to-Send (RTS) message followed by a Clear-to-Send (CTS) message exchanged between a source node and a destination node prior to sending an information message (e.g., a message containing audio, multimedia or data information).

Specifically, the source node transmits an RTS message to the intended destination node. If the intended destination node wishes to receive the message and believes that the channel is available (i.e., free of other traffic), the destination node responds with a CTS message. The receipt of the CTS message by the source node permits the transmission of the information message (MSG) which is typically followed by an Acknowledgment (ACK) message from the destination node when reception of the information message is successful. All other nodes within range of the CTS message mark the channel as busy for the duration of the message transfer. Provided that all nodes receive every CTS message, the protocol works well.

An example of a network employing CSMA/CA techniques is described in U.S. patent application Ser. No. 09/705,588, referenced above. In this type of network, a plurality of nodes communicate with each other using plural, shared parallel data channels and a separate reservation channel. As used herein, the term node refers to a communication device operating in a network of communication devices. The node may be a mobile communication device, such as a radio or wireless telephone, or the node may be stationary or fixed in a particular location. Also, as used herein, the term channel refers to a communication path between nodes, and different channels can exist on separate communication media or on a common communication medium, with individual channels being separated by any suitable means, such as time, frequency, or encoding.

Increased throughput is achieved by transferring messages over the multiple parallel data channels. One channel is dedicated for use as the reservation channel, and channel access is allocated on the multiple data channels in a distributed fashion. Access to the data channels is coordinated among the nodes by communicating message requests and corresponding replies on the separate reservation channel.

Any node in the network can also use the CSMA/CA technique described above to determine its distance or range to nodes at known locations, to thus enable a node to determine its own location. Specifically, as can be appreciated by one skilled in the art, any node can determine its location by determining its range from three known reference points. A node can therefore use the CSMA/CA technique to determine its ranges from three nodes at known locations, and can thus use these range values to calculate its own geographic location.

An example of this type of ranging is described in U.S. patent application Ser. No. 09/365,702, referenced above. In determining its range to a destination node, a source node transmits an RTS-T message to the intended destination node which, if available, responds with a time of arrival (TOA) message. To perform the ranging, the controller of the source node starts a timer immediately following transmission of the RTS-T message, and stops the timer when synchronization to the TOA message is obtained. The value of the timer represents the aggregate time equal to twice the propagation delay between the source and destination nodes, plus the fixed delay at the destination node that occurs between its receipt of the RTS-T message and transmission of the first symbol of the TOA message, and the duration of time for the source node to complete the synchronization sequence. The source node can perform the ranging during a desired number of RTS-T and TOA exchanges (e.g., ten RTS-T and TOA exchanges), and can average the ranged values to obtain a more accurate ranging value.

Although the ranging technique described above is suitable for obtaining an accurate ranging measurement, the technique can have several drawbacks. For example, the 4096 bit TOA sequence unnecessarily consumes precious bandwidth on the reservation channel. That is, assuming that the RTS-T waveform is 320 microseconds, the TOA reply is much greater in length in order to provide position information (e.g., GPS coordinates), delay calibration information, curve fitting results, and so on. If this TOA reply is transmitted on the reservation channel, the transmission reduces the amount of time available to make data channel reservations, and thus idles these data channels when they could be delivering messages. On the other hand, if the TOA reply is transmitted on a data channel, the two nodes involved in transmitting and receiving the TOA message are unable to monitor the reservation channel during this period, and thus miss information transmitted over the reservation channel pertaining to the channel reservations that are made while these node are tuned away from the reservation channel.

Furthermore, the turnaround time caused by the delay calibration (if required) and the curve fitting results is excessive and directly impacts the reservation channel. For example, calibration of a node thru an internal loopback removes the node from being tuned to the reservation channel, which can result in channel collisions, loss of routing updates, and the node's failure to respond to requests from other nodes. All of these occurrences can have negative performance implications on the network. Also, by requiring the reference node (i.e., the node being ranged) to perform the calibration while the ranging node is waiting for a response unnecessarily ties up the reservation channel which, in a multi-hop ad-hoc network, could result in a lost channel reservation attempt by another node due to both the near/far and the hidden terminal problems as can be appreciated by one skilled in the art.

It can be further noted that when the transceivers of the source and destination nodes perform any ranging transmissions (e.g., TOA transmissions) over a data channel when performing the ranging operations described above, or when exchanging any information messages, they are incapable of monitoring the information being transmitted from other nodes over the reservation channel. Therefore, during these periods, the source and destination nodes can miss messages pertaining to channel reservations that are being made by other nodes in the network.

In order to eliminate this deficiency, each node in the network can include a secondary receiver in addition to its primary receiver. The secondary receiver permits each node to continuously monitor the reservation channel, even when transmitting or receiving a message on one of the data channels. While monitoring the reservation channel, the nodes store the channel reservations that have been accomplished and avoid use of those channels until the reservations expire. The dedication of the second receiver eliminates the loss of reservation knowledge that occurs with the use of a single receiver for both the reservation and data transfer mechanisms, which is a serious limitation of conventional CSMA/CA schemes. By transmitting requests for channel access on a separate reservation channel and dedicating a receiver to receive and respond to such requests, transmission of information messages on the multiple parallel data channels can be coordinated among the nodes, collisions between request messages and information messages are eliminated, and collisions between the short request messages transmitted on the reservation channel are dramatically reduced. Further details of these features are set forth in U.S. patent application Ser. No. 09/705,588, referenced above.

Although the addition of a secondary receiver to the nodes is effective in enabling the nodes to monitor the reservation channel while transmitting and receiving data over a data channel, it is not always possible or desirable to add a second receiver to a node. For example, it may be preferable to avoid employing a second receiver in a mobile user terminal, such as a mobile telephony device, in order to keep the device as compact as possible. It may also be desirable to avoid employing a second receiver in certain types of nodes in order to reduce their overall cost and manufacturing complexity.

In addition, as discussed above, in order for a source node to retrieve an information message (MSG) from a destination node, a total of 8 transmissions (i.e., two series of RTS/CTS/MSG/ACK messages) must occur between the source and destination nodes. It is noted that when the MSG and ACK messages are being transmitted and received by the source and destination nodes, the primary receivers of those nodes are tuned to a data channel, and it is necessary for the secondary receivers to monitor the reservation channel. However, it would be desirable for the source node to be capable of retrieving an information message from the destination node on the reservation channel, to thus eliminate or at least minimize the need for a second transceiver.

Accordingly, a need exists for a system and method that is capable of reducing the number of transmissions required for a node to range other nodes while also enabling a node to continuously monitor the reservation channel during the ranging process, without the use of a second receiver. A need also exists for a system and method for enabling a source node to retrieve an information message from a destination node on a data channel with a reduced number of transmissions.

SUMMARY OF THE INVENTION

An object of the present invention is to provide a system and method for reducing the number of transmissions required for a node in a wireless communications network to range other nodes in the network, while also enabling the node to continuously monitor the reservation channel during the ranging process without the use of a second receiver, to enable the node to more efficiently determine its geographic location.

Another object of the present invention it to provide a system and method which enables a node in a wireless communications network to substantially reduce the amount of time the node is unable to monitor the reservation channel, while receiving information messages from other nodes in the network.

These and other objects of the present invention are substantially achieved by providing a communication node which is adapted for use in a wireless communications network and comprises a transceiver and a controller. The transceiver is adapted to transmit and receive messages to and from other nodes in the network over at least one of a plurality of shared data channels, and is tunable to a reservation channel to monitor channel access reservation messages transmitted by the other nodes in said network. The controller is adapted to control the-transceiver to transmit a range request message to at least one other of the nodes in the network over the reservation channel and to receive a range reply message from at least one other node over the reservation channel in response to the range request message, to enable the controller to determine a distance of the communication node from the other node based on the range request message and the range reply message. Specifically, the range request message is configured so as to indicate to the node being ranged, as well as any other node within the radio frequency (RF) range of the node performing the ranging, that the transceivers of the ranging and ranged nodes are not transitioning to a data channel. The controller can determine the distance by measuring a duration of time that elapses between a first moment when a portion of the range request message is transmitted by the transceiver and a second moment when a portion of the range reply message is received by the transceiver. The controller is further adapted to control the transceiver to receive an information message that has been transmitted over a reserved data channel by the other node substantially immediately after the other node transmitted the range reply message.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
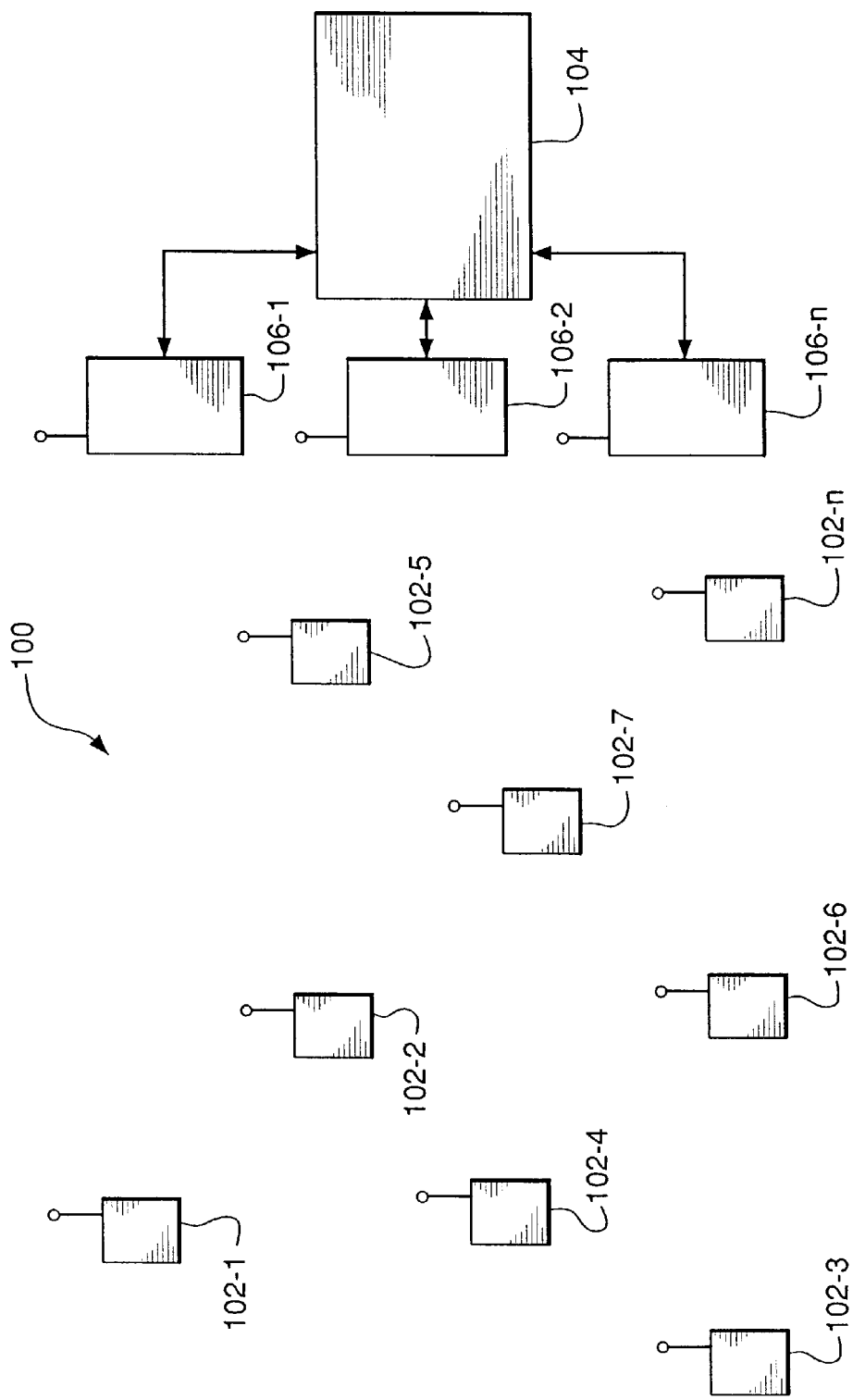
FIG. 1 is a block diagram of an example of a plurality of nodes in a wireless communications network that are each capable of ranging other nodes in the network, as well as receiving data from other nodes in the network, while continuing to monitor the reservation channel of the network without the use of a second receiver, in accordance with an embodiment of the present invention.

FIG. 1 is a block diagram illustrating an example of a wireless communications network 100 employing an embodiment of the present invention. Specifically, the network 100 can be an ad-hoc packet switched network, which includes a plurality of mobile nodes 102-1 through 102-n (referred to generally as nodes 102), and a fixed network 104 having a plurality of fixed nodes or access points 106-1, 106-2, . . . , 106-n (referred to generally as nodes 106), for providing the mobile nodes 102 with access to the fixed network 104. A node 102 can be a wireless telephone, radio, user terminal or any other suitable mobile wireless device. The fixed network 104 includes, for example, a core local access network (LAN), and a plurality of servers and gateway routers, to thus provide the mobile nodes 102 with access to other networks, such as the public switched telephone network (PSTN) and the Internet.

Figure 2:
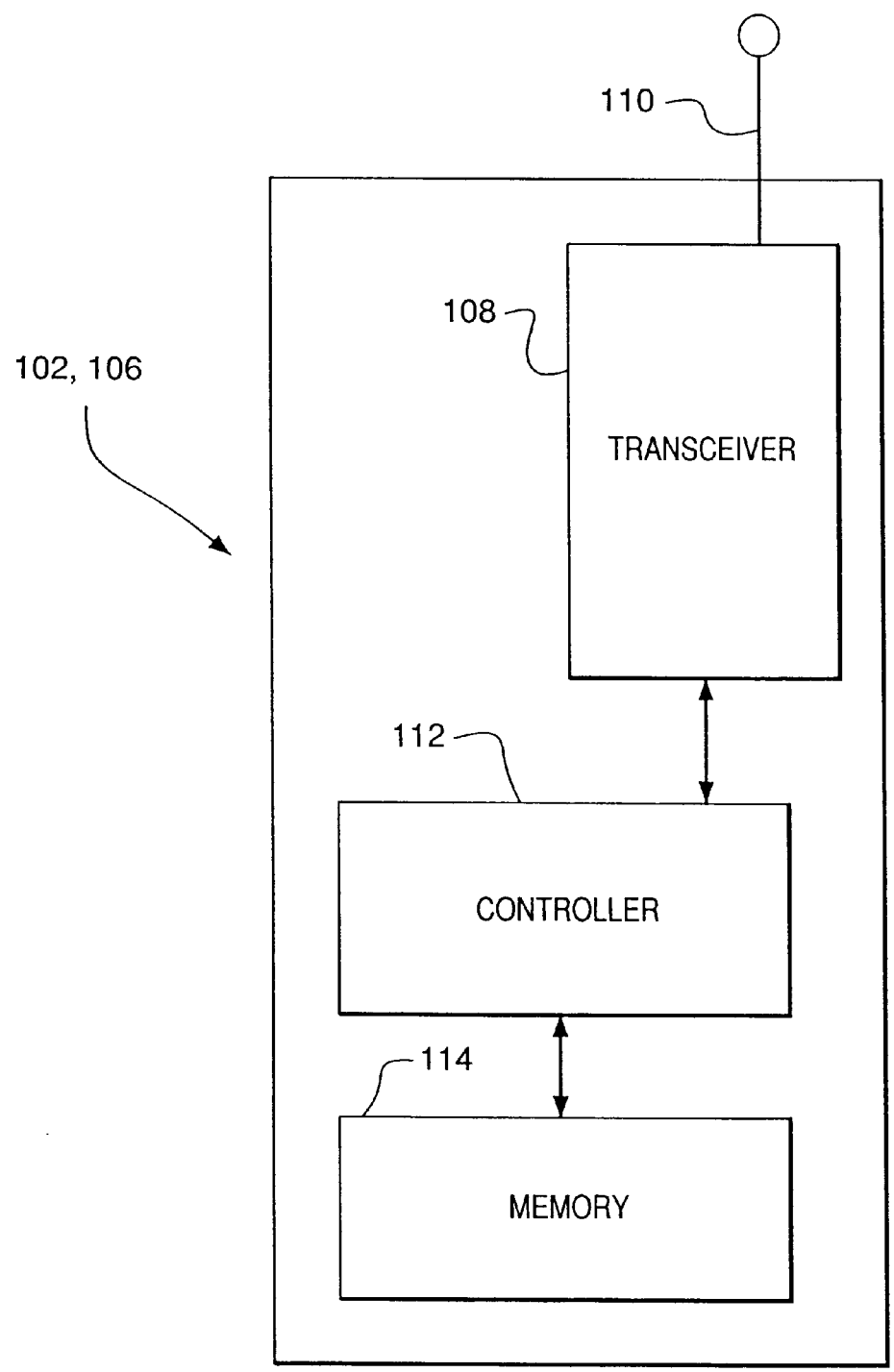
FIG. 2 is a block diagram of an example of a wireless node as shown in FIG. 1.

As shown in FIG. 2, each mobile node 102 or fixed node 106 includes a modem which is essentially a transceiver 108 including a transmitter and a receiver which are coupled to an antenna 110 and capable of respectively transmitting and receiving signals, such as packetized data signals, under the control of a controller 112. The packetized data signals can include, for example, voice, data or multimedia. Each node 102 or 106 further includes a memory 114, which can include a random access memory (ROM) for storing information pertaining to the operation of the node 102 or 106, and a random access memory (RAM) for storing information such as routing table information and the like in accordance with which data packets are transmitted, received and routed by the transceiver 108.

As described in U.S. patent application Ser. No. 09/705, 588, referenced above, each mobile node 102 and fixed node 106 can communicate over plural data channels as well as a reservation channel. These channels are not limited to any particular architecture or configuration, so long as each node 102 and 106 has the ability to access the channels. The channels can exist over any communication medium, such as wire, optical fiber, or wireless (over-the-air), and may employ any suitable transmission protocol.

Figure 3:
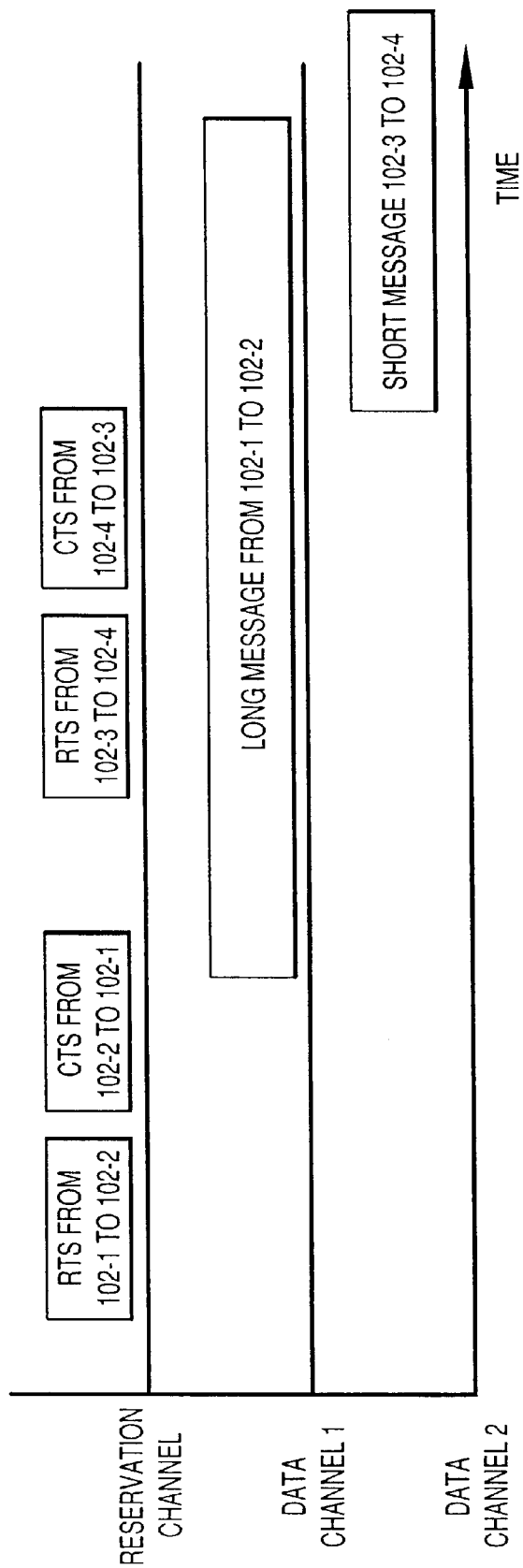
FIG. 3 is a time line of message events occurring on the reservation channel and the parallel data channels of the network shown in FIG. 1.

When a node, for example, node 102-1, wishes to transmit a message to another node, for example, node 102-2, node 102-1 transmits a Request-to-Send (RTS) message to node 102-2 in order to notify node 102-2 and other nodes 102 and 106 of its intent to reserve one of the available data channels. As shown in FIG. 3, the RTS message is transmitted by node 102-1 on the reservation channel. When a node 102 or 106 is not engaged in transmission or reception of messages on one of the data channels, its receiver is tuned to the reservation channel. However, when a node 102 or 106 is engaged in the transmission or reception of messages on one of the data channels, the receiver is tuned to that data channel instead of the reservation channel. Consequently, each node 102 and 106 is continuously monitoring the reservation channel with its receiver when it is not transmitting or receiving a message on one of the data channels.

Upon receiving the RTS from node 102-1 on the reservation channel, assuming a data channel is available, node 102-2 replies to node 102-1 with a CTS message on the reservation channel. Upon receiving the CTS message, node 102-1 then transmits the information message to node 102-2 on the available data channel, for example, data channel 1. Because channel access requests are transmitted on the separate reservation channel, another node 102 or 106 can transmit an RTS message shortly after a previous RTS/CTS exchange is completed without waiting for the subsequent information message to be completed.

For example, as further shown in FIG. 3, if node 102-3 wishes to send a message to node 102-4, node 102-3 can transmit an RTS message on the reservation channel after the CTS message from node 102-2 to node 102-1, irrespective of whether the information message being transmitted from node 102-1 to node 102-2 is still being transmitted on data channel 1. Node 102-4 then replies to node 102-3 with a CTS message, and node 102-3 subsequently transmits an information message on another available data channel, such as data channel 2. As seen in FIG. 3, the information message sent from node 102-3 to node 102-4 on data channel 2 can be transmitted simultaneously with the information message sent from node 102-1 to node 102-2 on data channel 1. The message from node 102-3 to node 102-4 is transmitted with essentially no delay resulting from transmission of the long message transmitted from node 102-1 to node 102-2.

As discussed in the Background section above, any node, in particular, any mobile node 102, can determine its location by determining its range from three known reference points. A node 102 can therefore use the CSMA/CA technique to determine its ranges from three nodes 102 and/or 106 at known locations, and can thus use these range values to calculate its own geographic location. For example, assuming that the locations of nodes 102-2, 102-3 and 102-4 are known, node 102-1 can range nodes 102-2, 102-3 and 102-4 using the CSMA/CA technique to obtain the necessary information to enable node 102-1 to calculate its own location.

Figure 4:
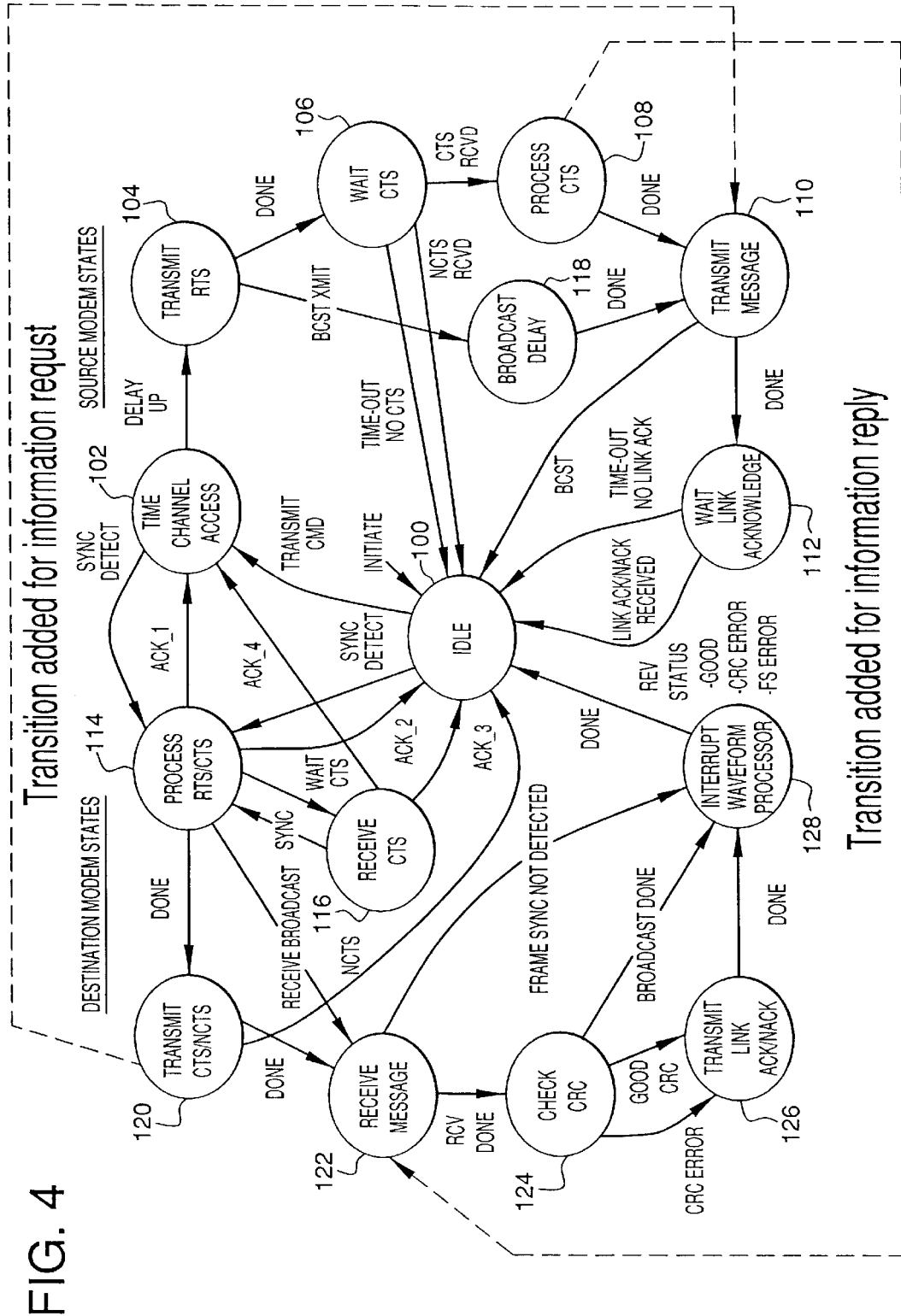
FIG. 4 is a state diagram illustrating an example of states through which the channel access state machine of the modem of a node transit during transmitting, receiving and channel monitoring operations in accordance with an exemplary embodiment of the present invention.

To assist in describing the ranging process, FIG. 4 is presented which illustrates a state diagram of the state machine of a modem of any node, for example, a node 102, in network 100 employing multi-channel carrier sense multiple access with enhanced collision avoidance (MC-CSMA/ E-CA) as described in U.S. patent application Ser. No. 09/705,588, referenced above. The state machine implements the CSMA/CA protocol with multiple data channels, and for ease of description, the modem states shown in FIG. 4 are loosely separated into "source modem states" (right side of FIG. 4) that each modem may typically enter while in the process of transferring a message, and "destination modem states" (left side of FIG. 4) that each modem may typically enter while in the process of receiving a message. However, it will be understood that the states shown in FIG. 4 constitute a single state machine, and the modem of each node 102 (or 106) may enter any of these states.

For example, upon initial turn on and power up (INITIATE), each modem enters the IDLE state 100 and is tuned to the reservation channel. When a source node is attempting to transfer a message to a destination node, the standard cycle of modem states of the source node includes the states of IDLE (100), TIME CHANNEL ACCESS (102), TRANSMIT RTS (104), WAIT CTS (106), PROCESS CTS (108), TRANSMIT MESSAGE (110), WAIT LINK ACKNOWLEDGE (112), and back to IDLE (100). These and the other states shown in FIG. 4 are described in much greater detail in U.S. patent application Ser. No. 09/705,588.

According to the technique described in the Background section above, if node 102-1 ranges another node, for example, node 102-2, the modem of node 102-1 transits through the above eight states. During the TRANSMIT MESSAGE (110) and WAIT LINK ACKNOWLEDGE (112) states, the ranging node 102-1 is away from the reservation channel and thus can experience a degradation in channel access reliability. In addition, as can be appreciated from FIG. 4, when node 102-2 is being ranged according to the technique described in the Background section above, the modem of node 102-2 transits through the following states: IDLE (100), PROCESS RTS/CTS (114), TRANSMIT CTS/NCTS (120), RECEIVE MESSAGE (122), CHECK CRC (124), TRANSMIT LINK ACK/NACK (126), INTERRUPT WAVEFORM PROCESSOR (128) and IDLE (100). During the RECEIVE MESSAGE (122), CHECK CRC (124), TRANSMIT LINK ACK/NACK (126), INTERRUPT WAVEFORM PROCESSOR (128), the node 102-2 being ranged is away from the reservation channel, and thus can also experience a degradation in channel access reliability.

The ranging node 102-1 then repeats the above process to range two other nodes, for example, nodes 102-3 and 102-4, to obtain the necessary amount of information to calculate its own location based on a triangulation technique as can be appreciated by one skilled in the art. This process of ranging three nodes 102-2, 102-3 and 102-4 takes about 10 ms, and during a large portion of this time, the modems of ranging node 102-1 and ranged nodes 102-2, 102-3 and 102-4, are tuned away from the reservation channel.

As will now be described, an embodiment of the present invention enables a node, for example, node 102-1, to determine the range to a known location, for example, node 102-2, using a modified request-to-send/clear-to-send procedure that does not require the modems of ranging node 102-1 and ranged node 102-2 to tune away from the reservation channel during the ranging process. Specifically, a Range Request RTS is transmitted by the ranging node 102-1, and is answered by a Range Reply CTS from the ranged node 102-2. The Range Request RTS is configured so as to indicate to the ranged node 102-2, as well as any other node 102-1 within the radio frequency (RF) range of the ranging node 102-1, that the transceivers 108 of the ranging and ranged nodes 102-1 and 102-2, respectively, are not transitioning to a data channel.

The range measurement is determined by measuring the amount of time from any known point in the Range Request RTS transmission until the reception of any known point in the Range Reply CTS. The known point can be, for example, the end of the synchronization pattern or the last bit in the message. As discussed in the Background section above, the controller 112 of the ranging node 102-1 can start a timer immediately following transmission of the Range Request RTS message, and stop the timer when synchronization to the Range Reply CTS is obtained. The value of the timer represents the aggregate time equal to twice the propagation delay between the source and destination nodes, plus the fixed delay at the destination node that occurs between its receipt of the Range Request RTS and transmission of the first symbol of the Range Reply CTS, and the duration of time for the source node to complete the synchronization sequence.

Referring again to FIG. 4, when performing the ranging operation according to an embodiment of the present invention, the modem of the ranging node 102-1 transits through the states of IDLE (100), TIME CHANNEL ACCESS (102), TRANSMIT RTS (104), WAIT CTS (106), PROCESS CTS (108), and back to IDLE (100). It is noted that the two states TRANSMIT MESSAGE (110), WAIT LINK ACKNOWLEDGE (112), which are the most expensive in terms of channel access reliability and bandwidth utilized, have been eliminated.

In accordance with an embodiment of the present invention, the modem of the node being ranged, for example, node 102-2, transits through the states of IDLE (100) PROCESS RTS/CTS (114), TRANSMIT CTS/NCTS (120), IDLE (100). Accordingly, the RECEIVE MESSAGE (122), CHECK CRC (124), TRANSMIT LINK ACK/NACK (126), and INTERRUPT WAVEFORM PROCESSOR (128) states have been eliminated.

As can be appreciated from the above, the collective amount of time that a ranging node 102-1 and ranged nodes 102-2, 102-3 and 102-4 spend to enable ranging node 102-1 to perform the location determining operations is reduced from approximately 10 ms to approximately 1.5 ms. Of somewhat greater importance, a significant improvement in channel access performance is also obtained. That is, since the modems of ranging node 102-1 and ranged nodes 102-2, 102-3 and 102-4 do not switch over to a data channel, the nodes 102-1, 102-2, 102-3 and 102-4 are able to continue their participation in the network 100 instead of merely noting that they missed a message while their modems were tuned to the data channel. It can be also noted that this avoids the use of a second receiver in the nodes to maintain continuous knowledge of the reservation channel as described in U.S. patent application Ser. No. 09/705,588, referenced above. The ability to accomplish the ranging measurements on the reservation channel achieves the same benefits associated with the ability to continuously monitor the reservation channel as in dual receiver design, without the additional expense, complexity and size increase associated with employing a second receiver in the nodes.

In addition, referring to FIG. 4, it is noted that the modem of a node (e.g., node 102-5) which is not involved in the transmission or reception of the RTS and CTS messages during the ranging process according to the embodiment of the present invention described above, or during a ranging process performed by the dual receiver design described in U.S. patent application Ser. No. 09/705,588, transits through the following states when the ranging process is being performed by the other nodes: IDLE (100), PROCESS RTS/CTS (114), RECV CTS (116), IDLE (100). In the dual receiver design, during the RECV CTS (116) state, the uninvolved node 102-5 expects to mark a channel and two addresses as busy for the expected duration of the ranging measurement, which is on the order of two milliseconds. However, in the improved process according to the embodiment of the present invention described above, this uninvolved node 102-5 has an additional channel and two additional nodes (e.g., nodes 102-1 and 102-2), with which it can transact messages without delay.

In addition, as will now be discussed, a modification to the RTS/CTS exchange described above can also enable a node, such as node 102-1, to more efficiently obtain an information packet from another node. As described in the Background section above, in the standard RTS/CTS/MSG/ACK exchange, the node (e.g., node 102-1) requesting the information packet and the node (e.g., node 102-2) providing the information packet each perform the RTS/CTS/MSG/ACK transmission and receiving operations. Accordingly, a total of 8 transmissions are required for a node 102-1 to obtain an information packet from another node 102-2. As also described, the modems of nodes 102-1 and 102-2 change their frequency from the reservation channel to a data channel during the MSG and ACK transmissions.

In accordance with an embodiment of the present invention, a node 102-1 can obtain an information packet from another node 102-2 with a total of 3 or 4 transmission between the nodes instead of 8. Specifically, as will now be described, the channel access state machine shown in FIG. 4 has been annotated to indicate that instead of the requestor node (e.g., node 102-1) transmitting a message (MSG) to the requestee node (e.g., node 102-2) after receiving a CTS message from the requestee node, the requester node receives a data packet from the requestee node immediately after or substantially immediately after receiving the CTS message from the requestee node.

That is, when the requestor node 102-1 issues an RTS, the requestee node 102-2 issues the CTS over the reservation channel, and then the MSG on the reserved data channel, which are received by the requestor node 102-1. Upon successfully receiving the message MSG, the requestor node 102-1 then optionally transmits an acknowledgement message ACK to the requestee node 102-2 on the reserved data channel. The states that the modem of the requesting node 102-1 transit during this process are IDLE (100), TIME CHANNEL ACCESS (102), TRANSMIT RTS (104), WAIT CTS (106), PROCESS CTS (108), RECEIVE MESSAGE (122), CHECK CRC (124), INTERRUPT WAVEFORM PROCESSOR (128) and IDLE (100). It can be noted from this sequence that the channel access state machine of node 102-1 has jumped from the transmit side to the receive side between PROCESS CTS and RECEIVE MESSAGE. This jump thereby reduces the number of total transmission between the nodes 102-1 and 102-2 from 8 to 3.

It can be further noted that the transmission of the acknowledgement message ACK has been removed in this example to reduce the amount of transmission overhead. The acknowledgement message ACK generally has two purposes, namely, to indicate the need for a retransmission attempt by the requestee node, and to return signal quality information to the requestee node. However, the requests for information made by the requestor node 102-1 are typically not subject to a retransmission attempt. Rather, any retransmission attempt must be re-initiated by the requestor. Also, the return of signal quality information to the requestee node 102-2 can be sacrificed to reduce the transmission overhead associated with this service.

The states that the modem of the requestee node 102-2 transit during this process are IDLE (100), PROCESS RTS/CTS (114), TRANSMIT CTS (120) TRANSMIT MESSAGE (110) and IDLE (100). It is noted that in this sequence, the channel access state machine of the requestee node 102-2 has jumped from the receive side between XMIT CTS and TRANSMIT MESSAGE. This requires the requestee node 102-2 to create a message for transmission immediately following the transmission of a CTS. This message consists of the transmission overhead (# bytes in message, CRC, . . . ) and the requested information.

Accordingly, the number of transmissions between the requester node 102-1 and requestee node 102-2 are reduced from 8 to either 3 or 4, depending on whether the requestor node 102-1 issues the optional acknowledgement message ACK. This reduction in transmissions thus improves the network throughput, delay, and reliability. These improvements further translate directly into improved service as viewed by the end user. Typical usage of this capability include, but are not limited to, the ability to obtain information such as the requestee's current position, access codes for a private network, regional transmit power or data rate limitations, data rates for routing and neighbor discovery messages, currently accepted priority level at a wireless router (WR) or IAP, available bandwidth at a WR or IAP, and the suitability of a node to act as a position reference, to name a few.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A communication node, adapted for use in a communications network, comprising:
   a transceiver, adapted to transmit and receive messages to and from other nodes in said network over at least one of a plurality of shared data channels, and being tunable to a reservation channel to monitor channel access reservation messages transmitted by said other nodes in said network; and
   a controller, adapted to control said transceiver to transmit a range request message to at least one other of said nodes in said network over said reservation channel and to receive a range reply message from said at least one other node over said reservation channel in response to said range request message, to enable said controller to determine a distance of said communication node from said at least one other node based on said range request message and said range reply message, said range request message being configured to indicate to at least said one other node that said transceiver and a transceiver of said one other node are not tuning to a data channel as a result of an exchange of said range request message and said range reply message.

2. A communication node as claimed in claim 1, wherein:
   said controller is further adapted to determine said distance by measuring a duration of time that elapses between a first moment when a portion of said range request message is transmitted by said transceiver and a second moment when a portion of said range reply message is received by said transceiver.

3. A communication node as claimed in claim 1, wherein:
   said controller is further adapted to control said transceiver to transmit a respective said range request message to each of a plurality of said other nodes in said network over said reservation channel and to receive a respective said range reply message from each of said plurality of other nodes over said reservation channel in response to said respective range request messages, to enable said controller to determine a respective distance of said communication node from each of said other nodes based on said respective range request messages and said respective range reply messages.

4. A communication node as claimed in claim 3, wherein:
   said controller is further adapted to determine a geographic location of said communications node based on said respective distances.

5. A communication node as claimed in claim 1, wherein:
said controller is further adapted to control said transceiver to receive an information message that has been transmitted over a data channel by said at least one other node substantially immediately after said at least one other node transmitted said range reply message.

6. A communication node, adapted for use in a communications network, comprising:
a transceiver, adapted to transmit and receive messages to and from other nodes in said network over at least one of a plurality of shared data channels, and being tunable to a reservation channel to monitor channel access reservation messages transmitted by said other nodes in said network; and
a controller, adapted to control said transceiver to transmit a range request message to at least one other of said nodes in said network over said reservation channel, and to receive a range reply message from said at least one other node over said reservation channel and an information message from said at least one other node over a reserved data channel in response to said ranges request message; and
wherein said information message includes at least one of the following; information presenting the current position of said at least one other node, access codes for a private network in which said at least one other node is operating, regional transmit power or data rate limitations associated with said at least one other node, data rates for routing and neighbor discovery messages relating to said at least one other node, currently accepted priority level at said at least one other node, available bandwidth at said at least one other node, and the suitability of said at least one other node to act as a position reference.

7. A communication node as claimed in claim 6, wherein:
said controller is further adapted to control said transceiver to transmit a respective said range request message to each of a plurality of said other nodes in said network over said reservation channel and to receive a respective said range reply message over said reservation channel and a respective said information message from each of said plurality of other nodes over respective reserved data channels in response to said respective range request messages.

8. A method for controlling a communication node, adapted for use in a communications network, to determine its position relative to at least one of a plurality of other nodes in said network, said other nodes in said network being adapted to communicate with each other over at least one of a plurality of shared data channels and to transmit channel access reservation messages over a reservation channel, the method comprising:
controlling a transceiver of said communication node to transmit a range request message to at least one other of said nodes in said network over said reservation channel and to receive a range reply message from said at least one other node over said reservation channel in response to said range request message, said range request message being configured to indicate to at least said one other node that said transceiver and a transceiver of said one other node are not tuning to a data channel as a result of an exchange of said range request message and said range reply message; and
determining a distance of said communication node from said at least one other node based on said range request message and said range reply message.

9. A method as claimed in claim 8, wherein:
said determining step determines said distance by measuring a duration of time that elapses between a first moment when a portion of said range request message is transmitted by said transceiver and a second moment when a portion of said range reply message is received by said transceiver.

10. A method as claimed in claim 8, wherein:
said controlling step controls said transceiver to transmit a respective said range request message to each of a plurality of said other nodes in said network over said reservation channel and to receive a respective said range reply message from each of said plurality of other nodes over said reservation channel in response to said respective range request messages; and
said determining step determines a respective distance of said communication node from each of said other nodes based on said respective range request messages and said respective range reply messages.

11. A method as claimed in claim 10, further comprising:
determining a geographic location of said communications node based on said respective distances.

12. A method as claimed in claim 8, further comprising:
controlling said transceiver to receive an information message that has been transmitted over a data channel by said at least one other node substantially immediately after said at least one other node transmitted said range reply message.

13. A method for controlling a communication node, adapted for use in a communications network, to receive an information message from at least one of a plurality of other nodes in said network, said other nodes in said network being adapted to communicate with each other over at least one of a plurality of shared data channels and to transmit channel access reservation messages over a reservation channel, the method comprising:
controlling a transceiver of said communication node to transmit a range request message to at least one other of said nodes in said network over said reservation channel; and
controlling said transceiver to receive a range reply message over said reservation channel and an information message from said at least one other node over a reserved data channel in response to said range request message; and
wherein said information message includes at least one of the following; information representing the current position of said at least one other node, access codes for a private network in which said at least one other node is operating, regional transmit power or data rate limitations associated with said at least one other node, data rates for routing and neighbor discovery messages relating to said at least one other node, currently accepted priority level at said at least one other node, available bandwidth at said at least one other node, and the suitability of said at least one other node to act as a position reference.

14. A method as claimed in claim 13, further comprising:
controlling said transceiver to transmit a respective said range request message to each of a plurality of said other nodes in said network over said reservation channel and to receive a respective said range reply message over said reservation channel and a respective said information message from each of said plurality of other nodes over respective reserved data channels in response to said respective range request messages.

15. A computer readable medium of instructions for controlling a communication node, adapted for use in a communications network, to determine its position relative to at least one of a plurality of other nodes in said network, said other nodes in said network being adapted to communicate with each other over at least one of a plurality of shared data channels and to transmit channel access reservation messages over a reservation channel, the computer readable medium of instructions comprising:

first set of instructions, adapted to control a transceiver of said communication node to transmit a range request message to at least one other of said nodes in said network over said reservation channel and to receive a range reply message from said at least one other node over said reservation channel in response to said range request message, said range request message being configured to indicate to at least said one other node that said transceiver and a transceiver of said one other node are not tuning to a data channel as a result of an exchange of said range request message and said range reply message; and a second set of instructions, adapted to control said communication node to determine a distance of said communication node from said at least one other node based on said range request message and said range reply message.

16. A computer readable medium of instructions as claimed in claim 15, wherein:

said second set of instructions is adapted to control said communication node to determine said distance by measuring a duration of time that elapses between a first moment when a portion of said range request message is transmitted by said transceiver and a second moment when a portion of said range reply message is received by said transceiver.

17. A computer readable medium of instructions as claimed in claim 15, wherein:

said first set of instructions is adapted to control said transceiver to transmit a respective said range request message to each of a plurality of said other nodes in said network over said reservation channel and to receive a respective said range reply message from each of said plurality of other nodes over said reservation channel in response to said respective range request messages; and said second set of instructions is adapted to control said communication node to determine its respective distance from each of said other nodes based on said respective range request messages and said respective range reply messages.

18. A computer readable medium of instructions as claimed in claim 17, further comprising:

a third set of instructions, adapted to control said communication node to determine its geographic location based on said respective distances.

19. A computer readable medium of instructions as claimed in claim 15, further comprising:

a fourth set of instructions, adapted to control said transceiver to receive an information message that has been transmitted over a data channel by said at least one other node substantially immediately after said at least one other node transmitted said range reply message.

20. A computer readable medium of instructions for controlling a communication node, adapted for use in a communications network, to receive an information message from at least one of a plurality of other nodes in said network, said other nodes in said network being adapted to communicate with each other over at least one of a plurality of shared data channels and to transmit channel access reservation messages over a reservation channel, the computer readable medium of instructions comprising:

a first set of instructions, adapted to control a transceiver of said communication node to transmit a range request message to at least one other of said nodes in said network over said reservation channel; and a second set of instructions, adapted to control said transceiver to receive a range reply message over said reservation channel and an information message from said at least one other node over a reserved data channel in response to said range request message; and wherein said information message includes at least one of the following; information representing the current position of said at least one other node, access codes for a private network in which said at least one other node is operating, regional transmit power or data rate limitations associated with said at least one other node, data rates for routing and neighbor discovery messages relating to said at least one other node, currently accepted priority level at said at least one other node, available bandwidth at said at least one other node, and the suitability of said at least one other node to act as a position reference.

21. A computer readable medium of instructions as claimed in claim 20, wherein:

said first set of instructions is further adapted to control said transceiver to transmit a respective said range request message to each of a plurality of said other nodes in said network over said reservation channel; and said second set of instructions is further adapted to control said transceiver to receive a respective said range reply message over said reservation channel and a respective said information message from each of said plurality of other nodes over respective reserved data channels in response to said respective range request messages.

* * * * *